United States Patent [19]

Gelula et al.

[11] 4,361,939

[45] Dec. 7, 1982

[54] COUPLING SYSTEM

[75] Inventors: Jerome D. Gelula, 535 E. 86th St., New York, N.Y. 10028; Bertram Slanhoff, Scarsdale; Isidore Kalichman, Elmhurst, both of N.Y.

[73] Assignee: Jerome D. Gelula, New York, N.Y.

[21] Appl. No.: 123,413

[22] Filed: Feb. 21, 1980

[51] Int. Cl.³ ............................................ A44B 17/00
[52] U.S. Cl. ............................ 24/211 M; 24/230 AT
[58] Field of Search .......... 24/211 L, 211 M, 230 AT

[56] References Cited

U.S. PATENT DOCUMENTS

| 690,659 | 1/1902 | Ney | 24/211 M X |
|---|---|---|---|
| 2,153,077 | 4/1939 | Clarke | 24/230 AT |
| 2,872,241 | 2/1959 | Shelden | 292/304 X |
| 2,970,796 | 2/1961 | Ross | 24/230 AT X |
| 3,179,997 | 4/1965 | Jalinaud | 24/230 AT |
| 3,196,824 | 7/1965 | Howard | 24/230 AT X |
| 3,311,188 | 3/1967 | Gutshall | 24/230 AT X |
| 3,564,672 | 11/1968 | McIntyre | 24/230 AT X |
| 3,713,192 | 1/1973 | Wallin | 24/230 AT |

FOREIGN PATENT DOCUMENTS

| 2337520 | 9/1977 | France | 24/230 AT |
|---|---|---|---|
| 694720 | 9/1965 | Italy | 24/230 AT |
| 498192 | 3/1976 | U.S.S.R. | 24/230 AT |
| 498193 | 3/1976 | U.S.S.R. | 24/230 AT |

*Primary Examiner*—Thomas J. Holko
*Attorney, Agent, or Firm*—Paul J. Sutton

[57] ABSTRACT

The present invention discloses a unique self-aligning, quick-release coupling system capable of releasably joining any two or more of a great variety of cooperative male/female mating items to be temporarily or permanently joined, at the option of the user. Spring-biased positive ejecting forces within the female subassembly otherwise tending to separate these items are used to reliably capture the male component until positive separation is desired. Relatively small adjustable threshold triggering forces are required to initiate separation.

In preferred embodiments, the mating members include round or polygonal cross-sections, tailored to the user's needs to facilitate keyed alignment; integrally moulded spring members, choices of dielectric materials for safe use in corrosive environments; and remote control of disengagement.

1 Claim, 22 Drawing Figures

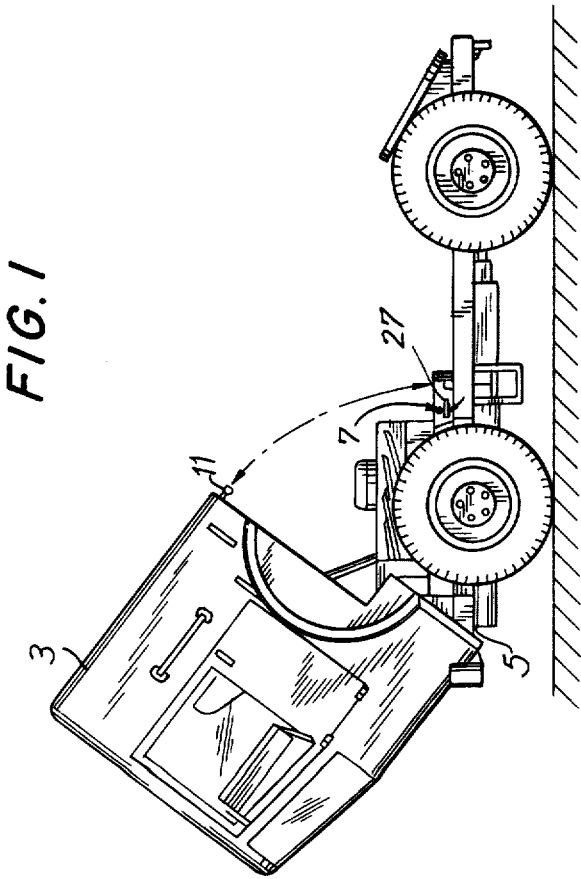
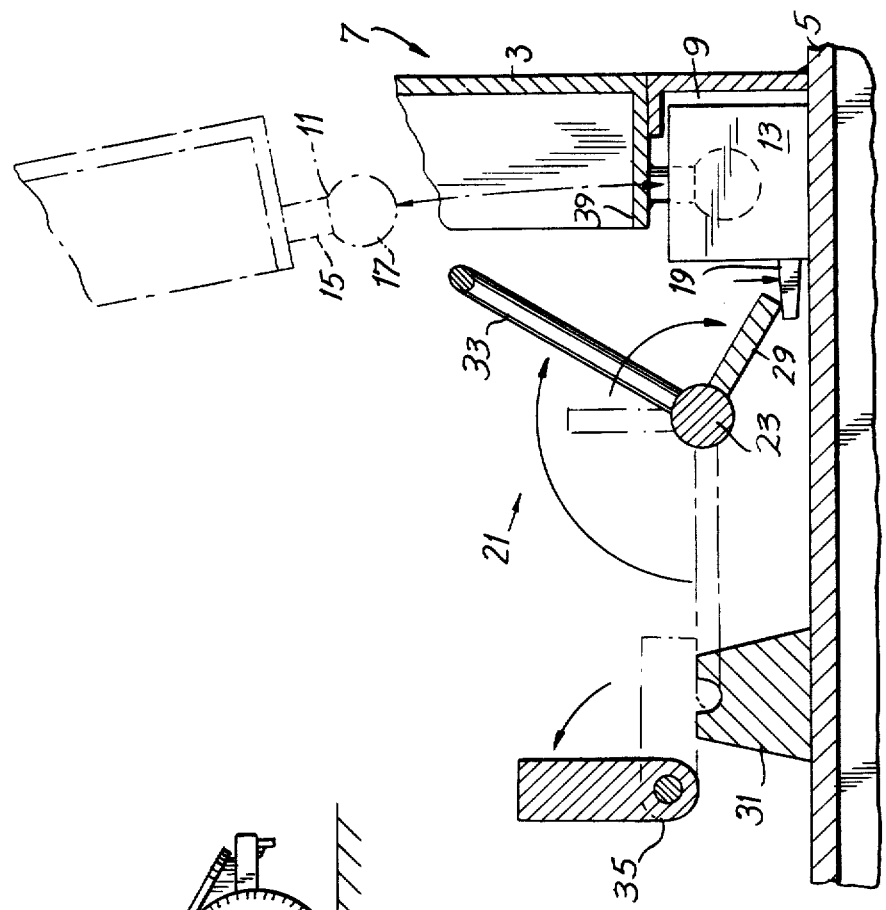
FIG.1
FIG.2

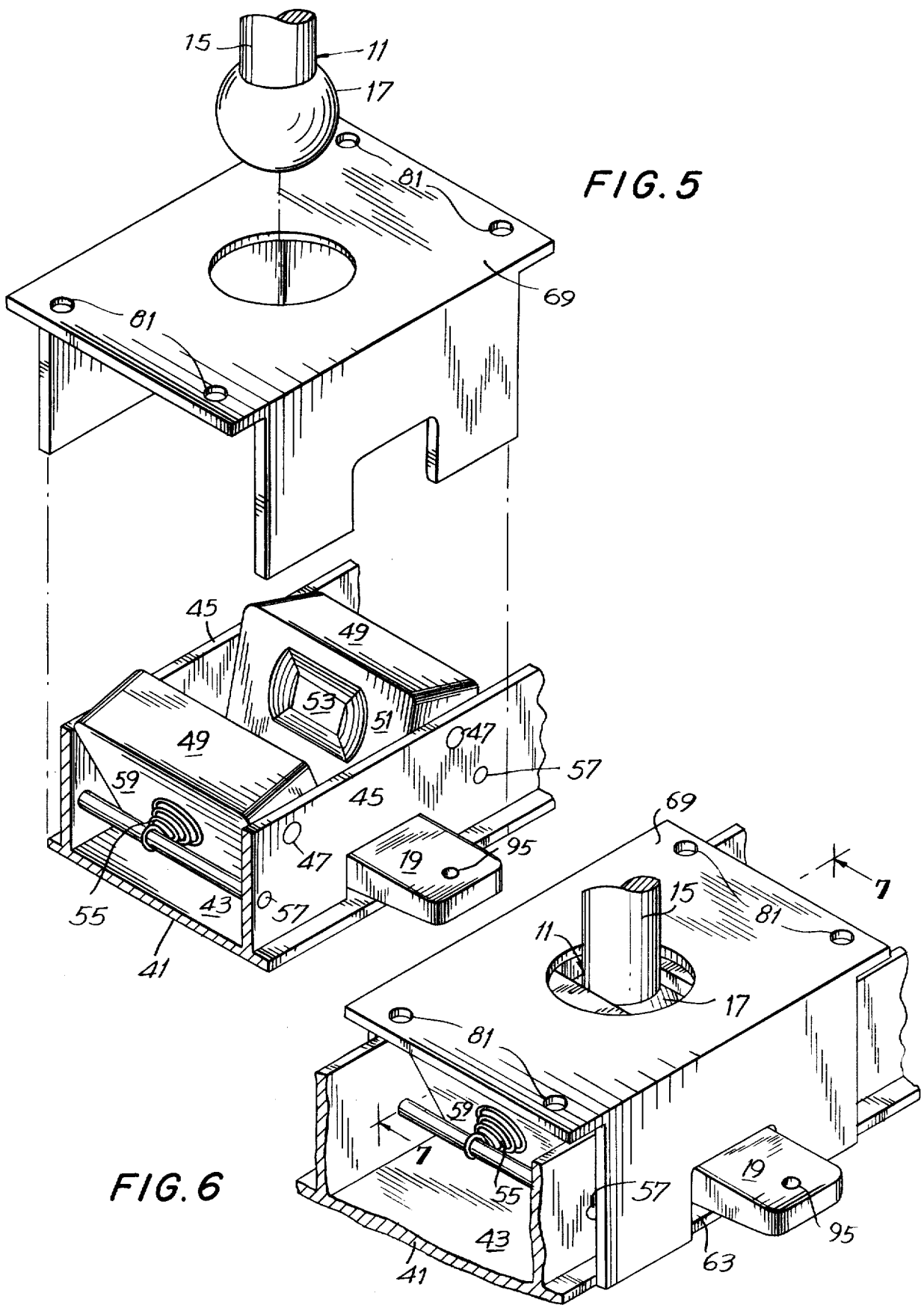

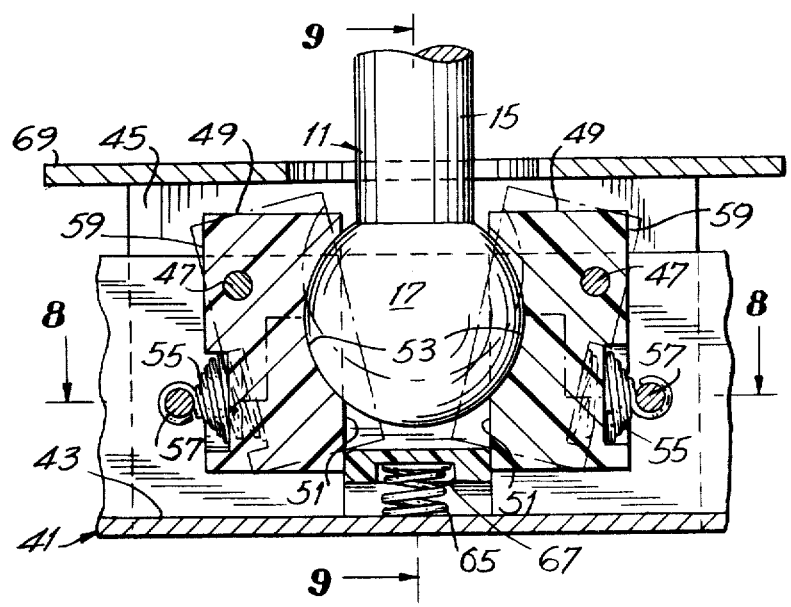
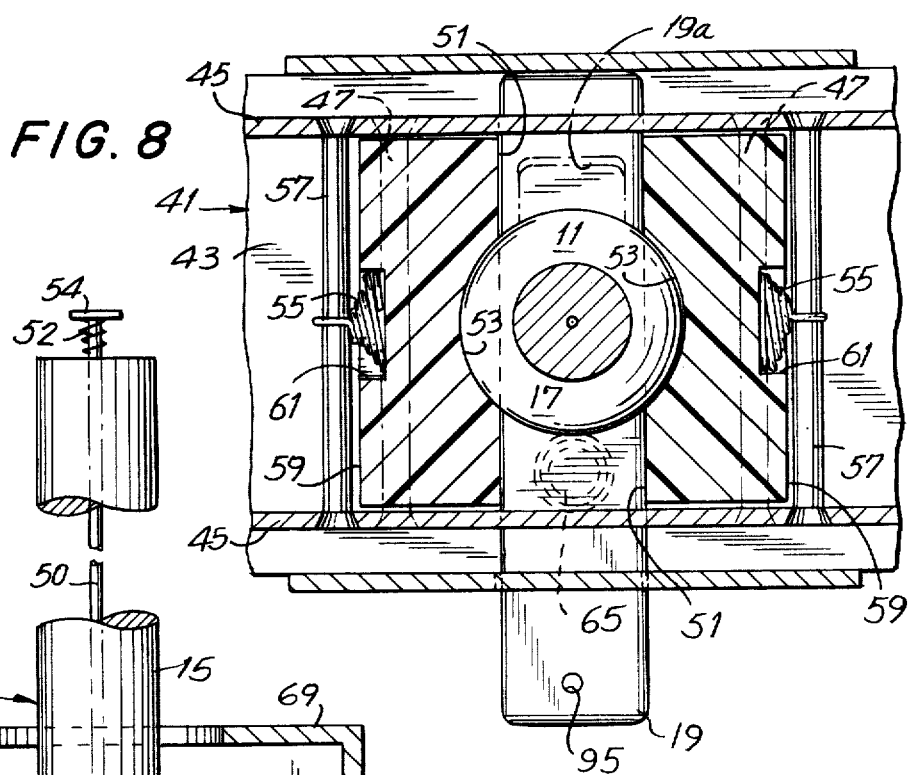
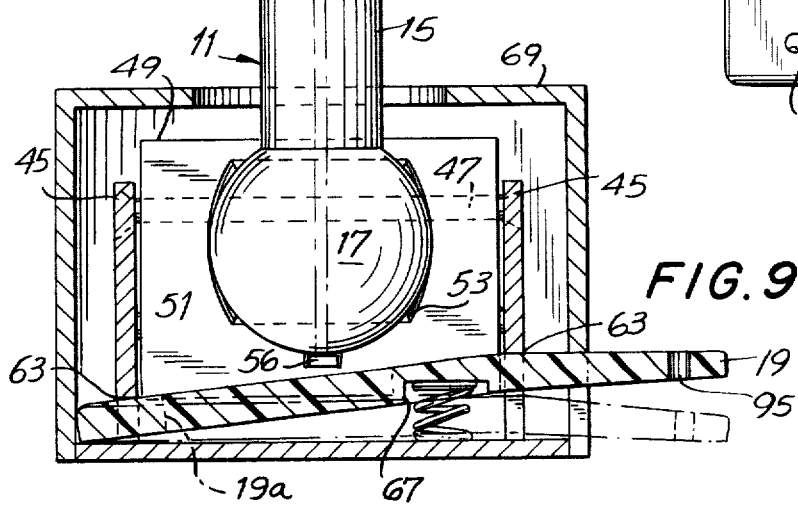

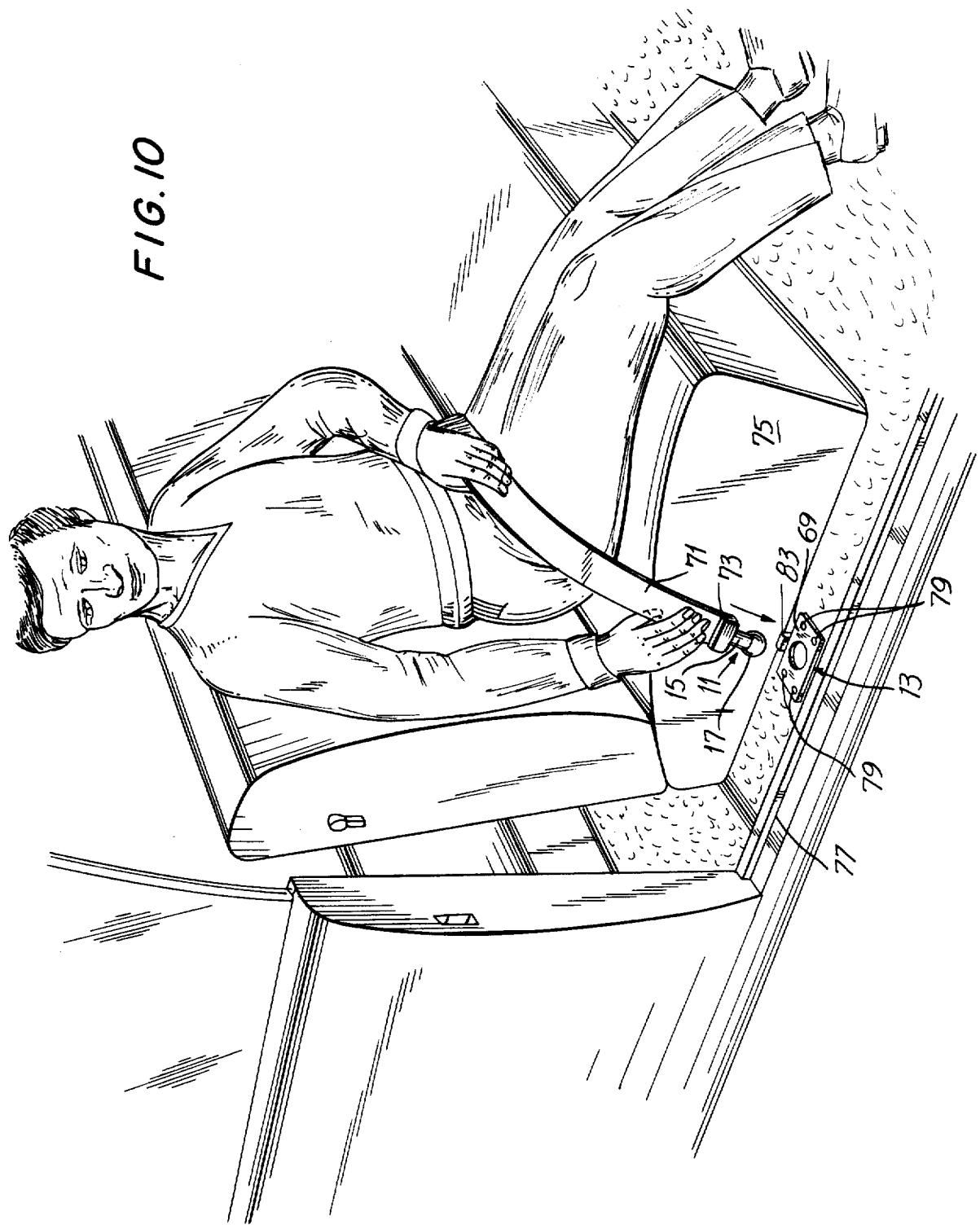

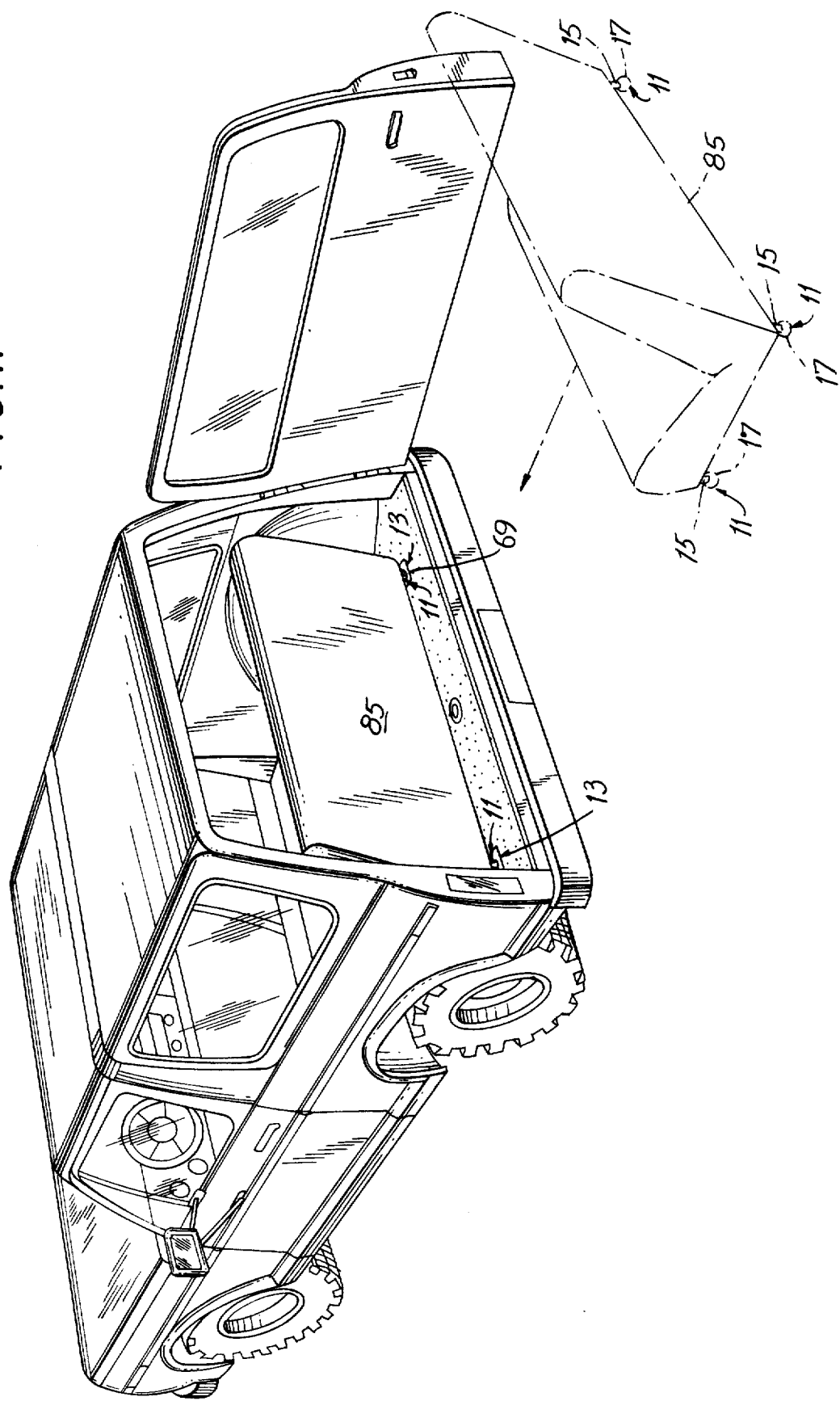

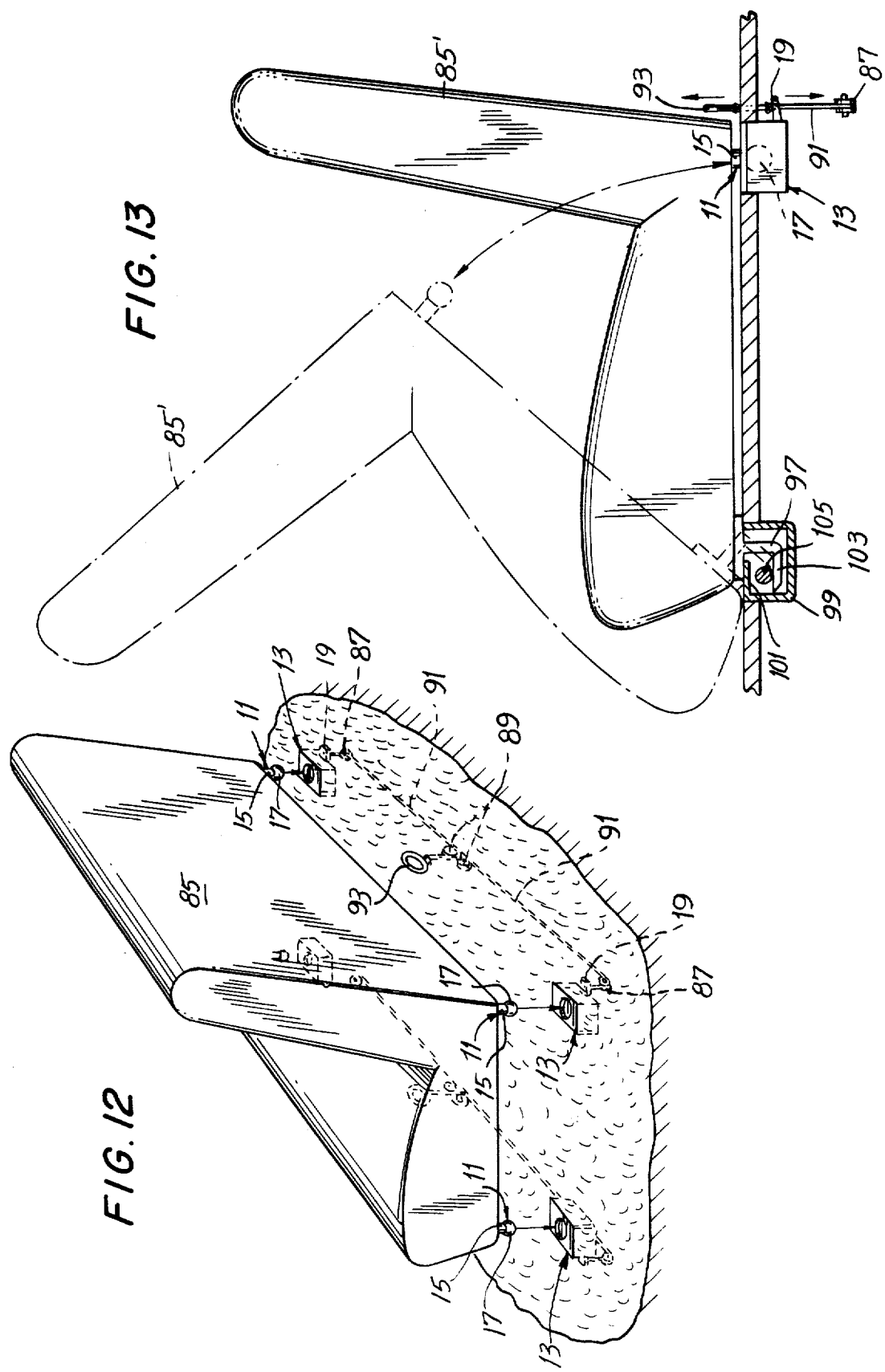

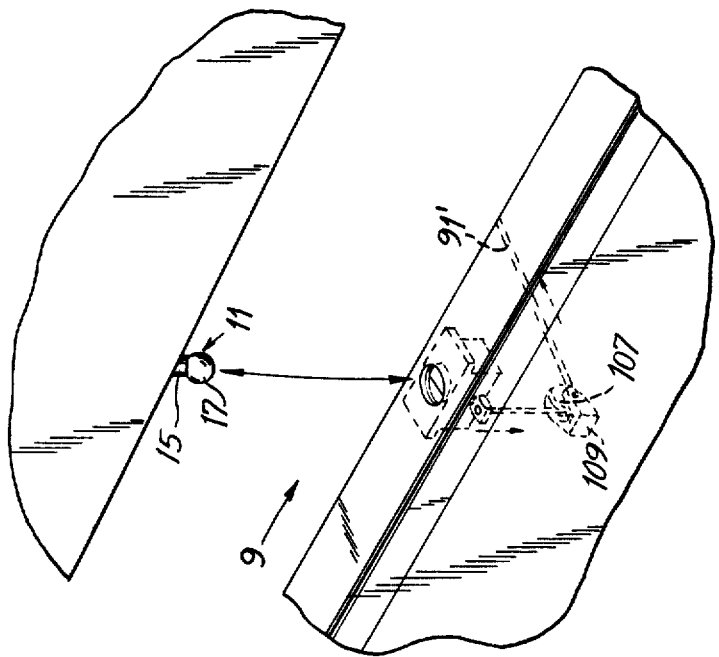
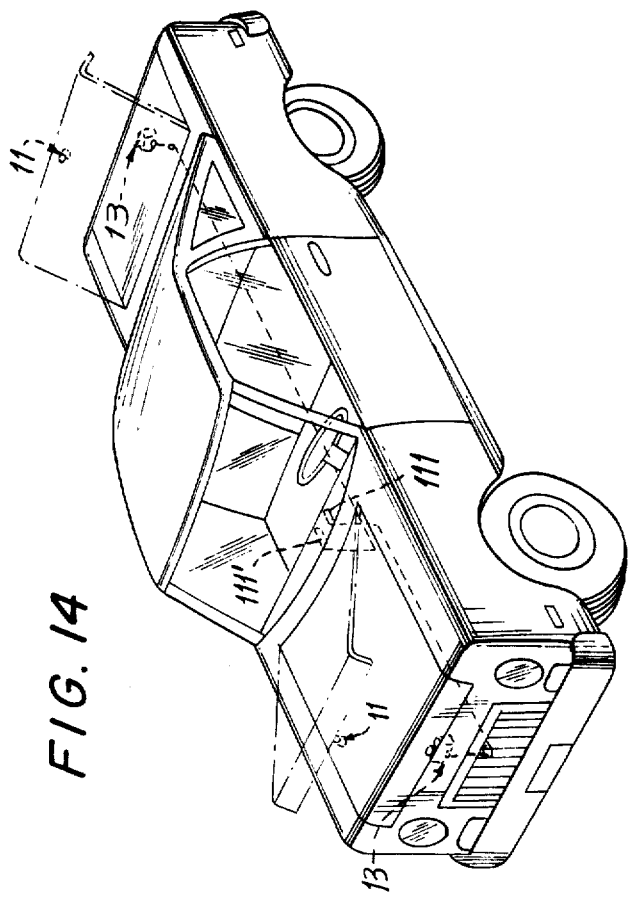

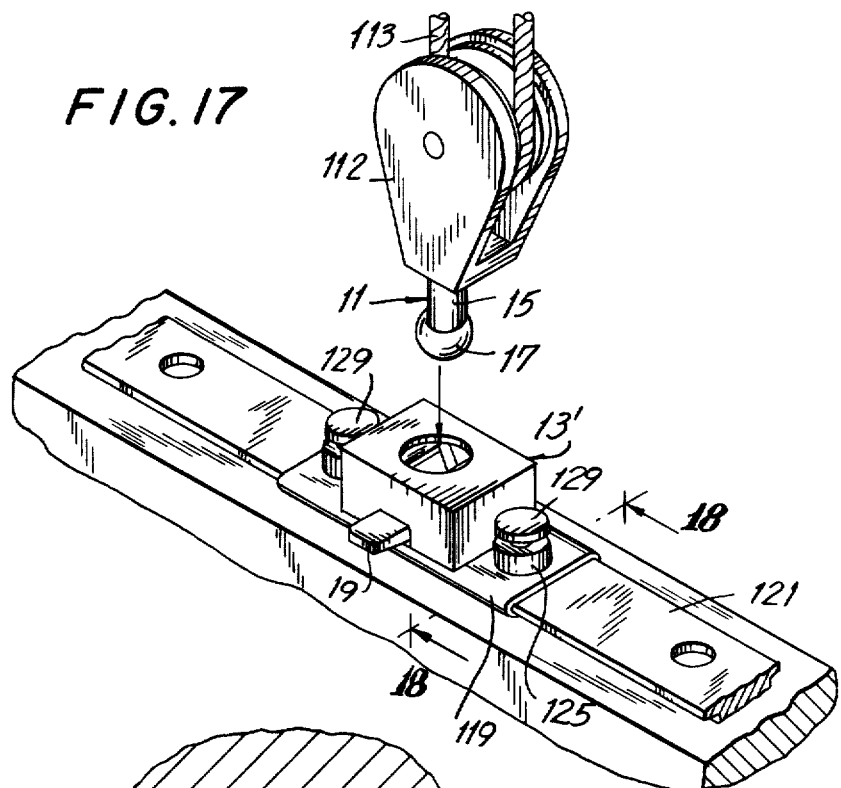
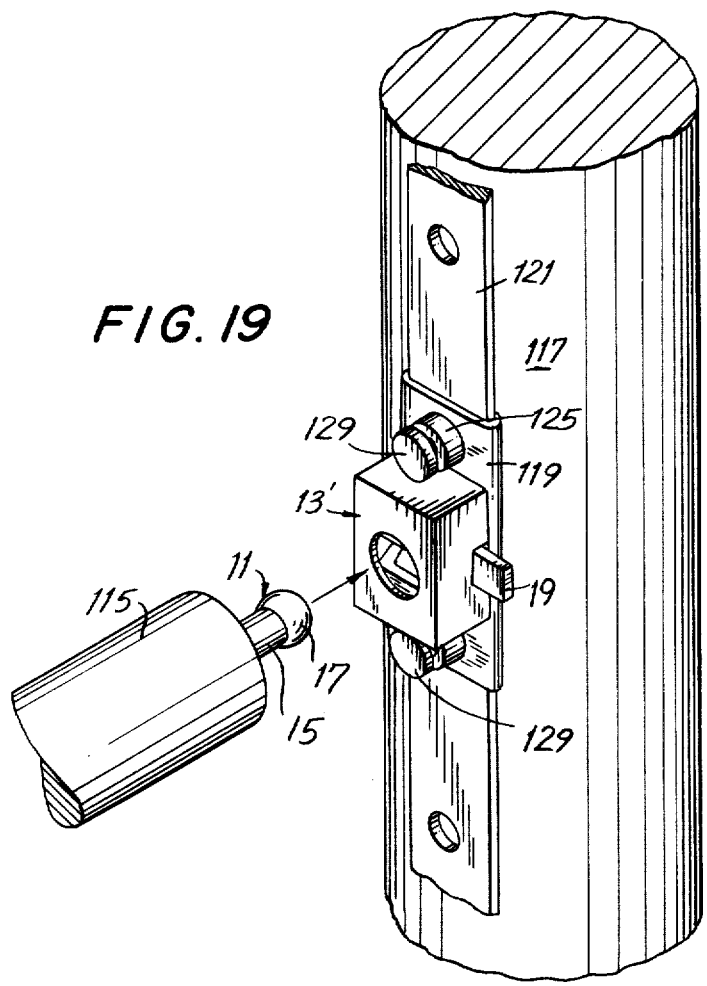
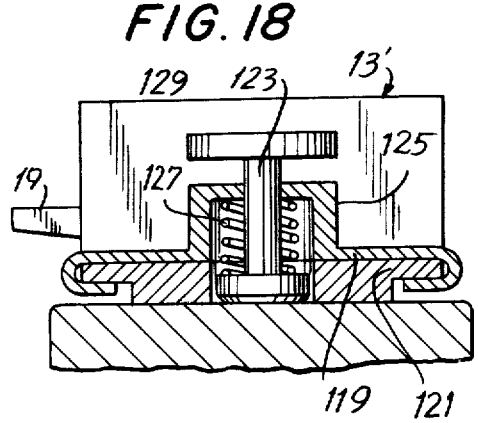

COUPLING SYSTEM

The present invention relates generally to couplings, and more specifically to a latching system capable of use in any number of distinct and related environments.

Over the years those of us who keep abreast of mechanical devices and useful "contraptions" must constantly be amazed at the variety of products that enter the marketplace, usually with the goal of filling specific needs of a specific industry application. With the age of specialization comes specialization in innovation. It is rare for any innovator today to be so bold as to attempt to design a "universal-type" product or device usable in many different enviroments.

Increasing governmental regulation in the areas of consumer product safety, occupational safety, trade regulation, and accountability of manufacturers and distributors has given ultimate users of products recourse unknown in the past. This has caused a retreat in the design engineering field to an approach where very little thought is given to product applications beyond the specific environment in which the manufacturer's products have traditionally been used or its distribution been established.

Quite the opposite has been attempted in developing the present invention, which comprises a coupling or latching system concept. Of course, tailoring to specific applications is contemplated, however, an effort will be made within this specification to portray and define a concept embodying a "family" of latches that is more appropriately termed a "system."

Another coupling or latch—who needs it?", some will ask. "What can be patentable about another latch, with the myriad of prior art available to choose from?", others will ask. The fact is that the present invention teaches a "universal-type" latching system and approach that will meet specific combinations of needs that no commercially available coupling can meet, as will be more fully explained below. As with most inventions patented today, the present invention in some respects draws upon and improves upon features of conventional prior art devices that exhibit shortcomings of one sort or another. However, an effort has been made to bring together a combination of elements which will perform the functions set forth below, and others, in a relatively inexpensive and efficient design.

This application and specification is meant to be the first of what will be many related applications, with the view toward separately protecting many of the unique features of the present invention. Apart from the obvious applications of the forms of the invention disclosed herein, it is an object of the present invention to provide a coupling system that exhibits automatic and positive latching, with a positive ejecting force capable of positively separating the members to be releasably joined.

Another object of the present invention is to provide a latching system, as above, which is fall-safe, even in the undesirable event distortion of one or more components occurs.

Yet another object is to provide a coupling system, as above, where the male and female members to be releasably joined are self-aligning at all times and at all points in their cooperative interaction.

A further object of this invention is to provide a novel coupling or latching system which accomplishes the objects herein set forth in a lightweight, inexpensive structure capable of repeated efficient and reliable manner. Still a further object is to provide such a system capable of being utilized by one person using one hand.

Another object is to provide the aforementioned system wherein actuation of both engagement and disengagement may be accomplished via mechanical, electrical, pneumatic and/or hydraulic means, and which is further able to be controlled remotely from one or more locations.

Still another object is to provide a non-corrosive latching system capable of use in otherwise hostile environments that include, without limitation, medical, marine, automotive, safety and any number of other applications.

Another object is to provide a novel latching system capable of being housed in existing structural configurations, such as I-beams or structural sections (channels), and which is self-cleaning in that buildup of undesirable dirt, grit or foreign matter that would otherwise affect the operation of the coupling simply exits the critical area either via gravity or natural or forced purging.

Still a further object of the invention is to provide a novel latching system, as above, wherein a predetermined and controlled actuating threshold force or pressure is utilized to separate male and female coupling members. Another object is to provide such a system, wherein a wide variety of shapes of the mating members facilitates universality of movement, keying, limited directional movement, and any number of easy or more difficult mating arrangements.

Another object is to provide such a coupling system, wherein little or no gripping of the male coupling member by the female coupling member occurs before a predetermined type of and magnitude of cooperation. A further object is to provide a novel cable-releasable ball configuration that may be controlled remotely.

The reader is expressly cautioned not to accept literally or to limit the invention to the specific embodiments of this invention herein disclosed and described. For example, while specific automotive and marine applications have been illustrated in the drawings, a great many others come to mind and are contemplated by the present invention. How many of us would like to see an application of this coupling system to oarlocks, for example, or trailer hitches, seat tie-downs, electrical connections, pneumatic connections, escape mechanisms that are not limited to parachutes, hatchback and trunk and hood latches that do not enable unsafe conditions, door latches for both industrial and home/office application, etc.

In the case of marine applications, as yet another example, it is contemplated that this invention have specific use in connection with deck-mounted blocks, connections for spinnaker/whisker poles, release levers, roller furling locations, fairleads, turnbuckles, non-deck-mounted blocks (swivel, lead, snatch, traveller, turning, vang and other blocks), snap shackles, pad eyes, cleats and even reefing accessories. In this regard it is contemplated that the great variety of hardware and accessories now manufactured and carried by retailers may be significantly reduced as a result of an ability with the present invention of creating more "universal" blocks, for example, that may be interchanged and positioned in a great many locations.

The foregoing objects and features of the present invention will be more apparent from a reading of the following technical specification wherein similar reference characters are used in conjunction with the several views of the drawings.

DESCRIPTION OF THE DRAWINGS

FIG. 1 is a side elevation view of a preferred embodiment of the invention installed in an environment in one disposition.

FIG. 2 is a sectional side elevation of the preferred embodiment of the invention with said one of its dispositions shown in solid lines and another of its dispositions shown in phantom lines.

FIG. 5 is an exploded perspective view of the apparatus of the preferred embodiment of the invention.

FIG. 6 is a perspective view of the assembled apparatus of the preferred embodiment of the invention.

FIG. 7 is a sectional elevation view taken through line 7—7 of FIG. 6.

FIG. 8 is a sectional plan view taken through line 8—8 of FIG. 7.

FIG. 9 is a sectional elevation view taken through line 9—9 of FIG. 7.

FIG. 10 is a perspective view of a first alternate preferred embodiment of the apparatus of the invention in its intended environment.

FIG. 11 is a perspective view of a second alternate preferred embodiment of the invention as used in its intended environment.

FIG. 12 is a perspective view of the second alternate preferred embodiment of the invention of FIG. 11 in a disposition in relation to its intended environment.

FIG. 13 is a side sectional elevation showing the apparatus of the invention as used in FIGS. 11 and 12 in a modified environment.

FIG. 14 is a perspective view of a third alternate preferred embodiment of the invention in its intended environment.

FIG. 15 is an enlarged perspective view showing a portion of the apparatus of the invention shown in FIG. 14.

FIG. 17 is a perspective view of the fourth alternate preferred environment of the invention in one application in the environment shown in FIG. 16.

FIG. 18 is a sectional elevation view of the fourth alternate preferred embodiment of the invention shown in FIG. 17.

FIG. 19 is a perspective view of the fourth alternate preferred embodiment of the invention as used in a different application in the environment shown in FIG. 16.

DESCRIPTION OF THE PREFERRED EMBODIMENTS

Figure 4:
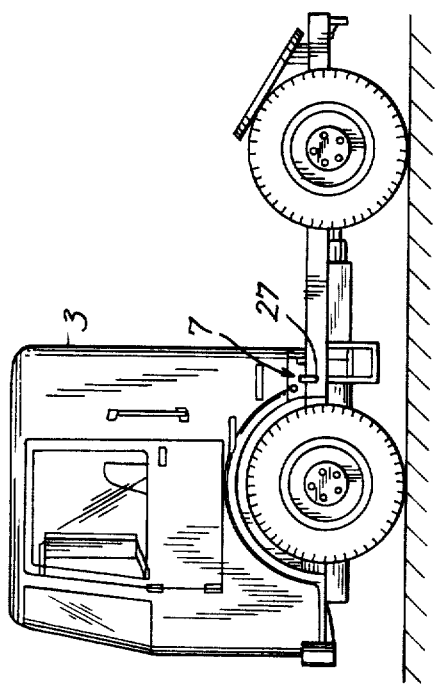
FIG. 4 is a side elevation view of the preferred embodiment of the invention installed in its intended environment in the disposition shown in FIG. 3.
Figure 3:
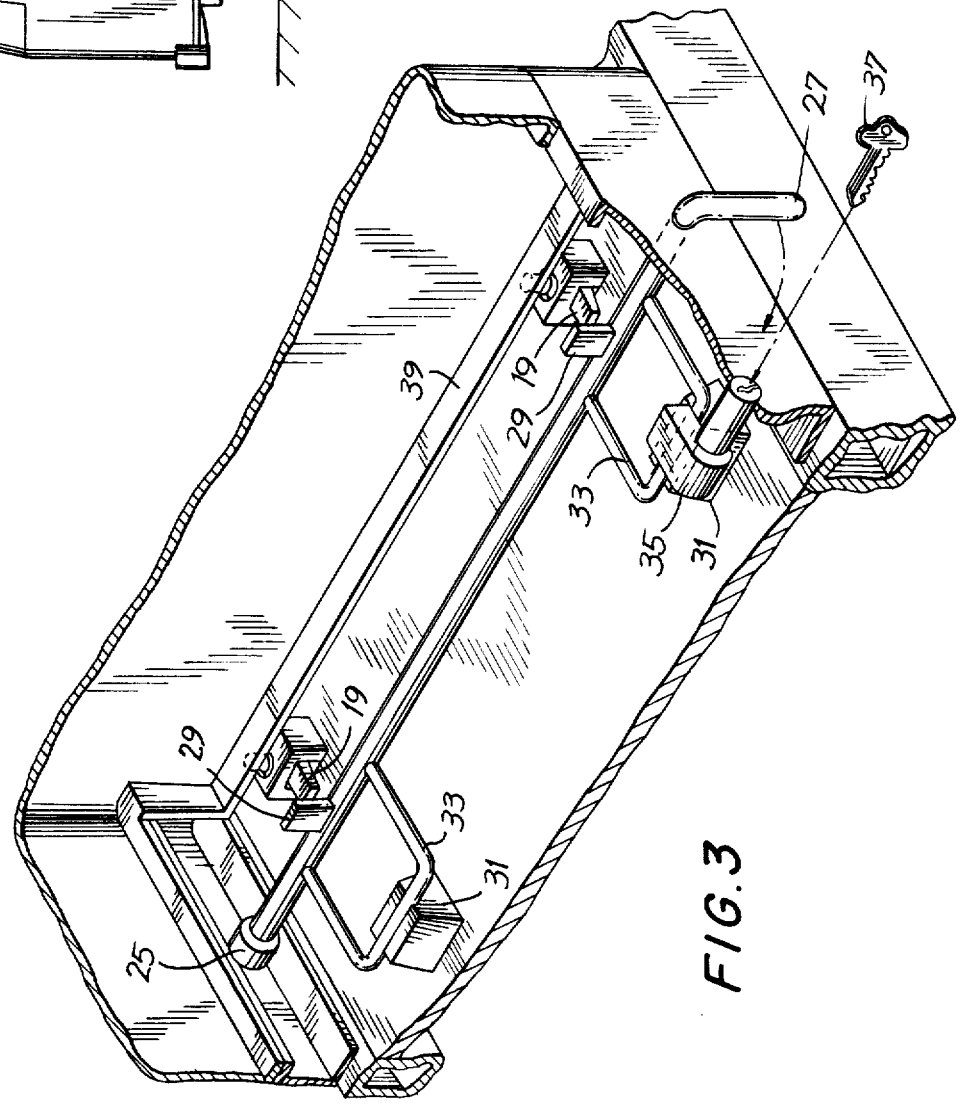
FIG. 3 is a perspective view of the preferred embodiment of the invention in its other disposition.

Referring now to FIG. 1 of the drawings, there is shown a tractor 1 normally used to haul a trailer (not shown) containing goods to be transported by highway. The tractor 1 has a cab 3 which is pivotally mounted on the chasis 5 of the tractor 1 for upward rotation to expose the engine compartment. A latching device 7 according to the invention is provided to securely hold the cab 3 in its normal downward position as shown in FIG. 4 for operation of the tractor 1 and for releasing the cab 3 for rotation to the upward position shown in FIG. 1 for inspecting or servicing apparatus in the engine compartment. Referring now to FIGS. 2 and 3 of the drawings, the latching device 7 for securely holding the cab 3 in the downward position shown in FIG. 4 includes a latching connector assembly 9 having a male connector 11 and a female connector 13. The male connector 11 includes a cylindrical shaft 15 adapted to be connected at one of its ends to the posterior undersurface of the cab 3. The other end of the shaft 15 terminates in a bulbus expanded portion 17 adapted to be releasably engaged in the female connector 13 which is adapted to be fixedly mounted to the chasis 5 of the tractor 1.

The bulbus portion 17 of the male connector 11 is securely held within the female connector 13 until a release mechanism in the female connector 13 is actuated by application of pressure against a projecting tongue 19 which causes the bulbus portion 17 of the male connector 11 to be released thereby permitting the cab 3 of the tractor 1 to be pivoted upwardly to the position shown in FIG. 1.

In order to insure that the cab 3 of the tractor 1 is securely latched in the position shown in FIG. 4 when the engine compartment of the tractor 1 is not to be exposed, two latching devices 7 are preferably mounted at opposite sides of the tractor 1 with the respective female connectors 13 being mounted on opposite sides of the chasis 5 and the respective male connectors 11 being mounted adjacent opposite corners of the posterior undersurface of the cab 3 for alignment with the female connectors 13 when the cab 3 is in the downward position shown in FIG. 4.

Mounted on the chasis 5 of the tractor 1 is a manually actuated release mechanism 21 for simultaneously depressing the tongue members 19 of the respective connector assemblies 9 in order to disengage the male connectors 11 from the female connector 13. The release mechanism 21 includes an elongated cylindrical shaft 23 journalled in axially aligned bushings 25 in opposite walls extending upwardly from opposite sides of the chasis 5. One end of the shaft 23 is bent at 90° to the axis of the shaft 23 to form a handle portion 27 which can be grasped for rotating the shaft 23 about its axis.

Extending radially from the circumference of the shaft 23 at positions in alignment with the tongues 19 of the female connectors 13 are rectangular projections 29 which serve as depressors for depressing the tongues 19 to release the male connectors 11 from the female connectors 13 when the shaft 23 is rotated by means of the handle portion 27 in a clockwise direction.

In order to limit rotation of the shaft 23 in a counterclockwise direction and to prevent unwanted or unauthorized rotation of the shaft 23 to disengage the male connectors 11 from the female connectors 13, there are mounted on the surface of the chasis 5 in alignment with the connector assemblies 9 but on opposite sides of the shaft 23 from the connector assemblies 9, pillar blocks 31. Each of the pillar blocks 31 is provided with a cylindrical groove in its upper surface to receive the bridging portion of a respective U-shaped member 33 having parallel legs spanned by the briding portion. The U-shaped members 33 extend radially from the circumference of the shaft 23 in alignment with respective connector assemblies 9, tongue depressor projections 29 and pillar blocks 31. The U-shaped members 33 are disposed in a common plane substantially orthogonal to a common plane in which the tongue depressor projections 29 are disposed.

The one of the pillar blocks 31, adjacent the handle 27, can be provided with a lock 35 including a latching member and a key-actuated cylinder as will be known to those skilled in the art for latching the respective U-member 33 to the corresponding pillar block 31 to prevent unauthorized rotation of the handle 27 for disengaging the male connector 11 from the female connector 13 of the connector assembly 9. The latching member of the lock 35 can be pivotally mounted so that when the cylinder of the lock 35 is released by means of a key 37, the latching member can be rotated away from the U-member 33 thereby permitting it to rotate with the shaft 23 to a position at which the tongue depressor projections 29 engage the tongues 19 of the connector assembly 9 to effect releasing.

For added strength, the male connectors 11 can be mounted on a frame member 39 preferably made of steel or a similar strong metal and welded or otherwise securely connected to the cab 3.

The connector assembly 9 will now be described in detail with reference to FIGS. 5–9 of the drawings.

Referring now to FIG. 5 of the drawings, the male connector 11 as previously explained has a shaft 15 extending from a bulbus portion 17. The bulbus portion 17, as illustrated in the drawings, is spherical to permit ease of insertion in the female connector 13 and to permit relative rotation of the male connector 11 about the axis of the shaft 15 with respect to the female connector 13. If it is desired to prevent relative rotation between the male connector 11 and female connector 13, the bulbus portion 17 can be provided with one or more flat surfaces such as in a polygonal configuration, or it can be provided with indentations or projections adapted to engage with complementary indentations or projections within the female connector 13.

The female connector 13 includes a housing 41 having a floor portion 43 adapted to be seated upon the surface of a member to which it is to be attached, e.g., the chasis of the tractor 1, and opposite transverse parallel walls 45. Pivotally mounted on cylindrical pins 47 orthogonally spanning the walls 45 are respective jaws 49 having opposing surfaces 51 in which there are formed respective hollows 53. The lower portions of the jaws 49 are urged toward one another by compressed springs 55, each of which has an end looped about a respective pin 57 which is closer to the floor 43 of the housing 41 than are the pins 47 so that pressure exerted by the springs 55 against surfaces 59 of the jaws 49 causes rotation of the jaws 49 about the pins 47 with the lower portions of the jaws 49, that is the portions proximate the floor 43, mutually approaching one another while the upper portions of the jaws 49, that is distal from the floor 43, are urged away from one another. Formed in the surfaces 59 of the jaws 49 are circular recesses 61 which have a diameter slightly larger than the largest diameter of the springs 55 for receiving the ends of the springs 55 and preventing substantial lateral movement of the springs 55, that is, movement in a plane parallel to the jaw surfaces 59.

Disposed between the jaws 49 for maintaining the jaws 49 in mutually parallel disposition, that is with the surfaces 51 of the jaws 49 in spaced parallel relationship to one another is the tongue 19. The tongue 19 is pivotally mounted on the floor 43 of the housing 41 and spans the region between the walls 45 intermediate the jaws 49. Cutouts or notches 63 are provided in the lower portions of the walls 45 to permit each end of the tongue 19 to extend beyond the walls 45. As can best be seen in FIG. 9, the height of the cutout 63 adjacent the actuating end of the tongue 19 is greater than the height of the cutout 63 adjacent the opposite end of the tongue 19. The height of the cutout adjacent the opposite end of the tongue 19 is only slightly greater than the thickness of the tongue 19 so that the opposite end of the tongue 19 is held in close proximity to the floor 43. The actuating end of the tongue 19 is free, due to the increased height of the cutout in its adjacent wall 45 to swing upwardly and downwardly about a fulcrum at the interface of the opposite end of the tongue 19 and its respective engaging wall 45.

There is sufficient clearance between the lowermost surfaces of the jaws 49 and the floor 43 of the housing 41 so that when the actuating end of the tongue 19 is in its lowermost position adjacent the floor portion 43 the lowermost surfaces of the jaws 49 can pivot toward one another urged by the springs 55 toward a position above the tongue member 19 as shown in phantom lines in FIG. 7. However, when the lowermost surfaces of the jaws 49 are separated so that the confronting surfaces 51 are parallel to one another the distance separating the confronting surfaces 51 of the jaws 49 is slightly greater than the width of the tongue 19 thereby permitting the tongue 19 to be moved upwardly into the region separating the jaws 49 and thereby preventing pivotal movement of the jaws 49 as shown in solid lines in FIG. 7.

The actuating end of the tongue 19 is normally urged upwardly by a spring 65 which is compressed between the floor 43 of the housing 41 and an undersurface of the tongue 19 formed in a circular recess 67 to prevent lateral movement of the spring 65, that is movement in a plane parallel to the surface 43 of the housing 41.

The spring 65 urges the tongue 19 upwardly so that when the jaws 49 are in the position shown in phantom lines in FIG. 7 the adjacent upper surface of the tongue 19 is urged against the lowermost surfaces of the jaws 49.

If the confronting surfaces 51 of the jaws 49 are urged apart below the pins 47 a sufficient distance, as for example when the bulbus portion 17 of the male connector 11 is forced between them, the lowermost surfaces of the jaws 49 pivot outwardly until they are separated by a distance greater than the width of the tongue 19 at which time the tongue 19 is urged upwardly by the spring 65 into a position in the arcuate paths of the lower regions of the jaws 49 as shown in solid lines in FIG. 7 thereby preventing the jaws 49 from pivoting to their previous positions until the actuator end of the tongue 19 is again depressed.

The distance between the upper edges of the confronting surfaces 51 on the jaws 49 is greater than the diameter of the bulbus portion 17 of the male connector 11 when the jaws 49 are open, that is in the position shown in phantom lines in FIG. 7. The distance between the same upper edges is less than the diameter of the bulbus portion 17 of the male connector 11 when the jaws are closed, that is in the position shown in solid lines in FIG. 7. The confronting surfaces of the hollows 53 in the facing surfaces 51 of the jaws 49 are, however, separated sufficiently to receive the bulbus portion 17 and retain it thereby permitting the jaws 49 to be pivoted from an opened to a closed disposition while the bulbus portion 17 of the male connector 11 is retained between the jaws 49. The lowermost edges defining the hollows 53 act as cam surfaces for causing the jaws 49 to be rotated from an open to a closed position as the bulbus portion 17 of the male connector 11 is urged downwardly between the jaws 49 of the female connector assembly 13.

Thus it can be seen that the jaws 49 of the female connector assembly 13 are actuable between an open position in which the jaws 49 are pivoted with their confronting surfaces 51 in a V relationship with the upper surface of the tongue 19 below the jaws 49 and a closed position with the confronting surfaces 51 of the jaws 49 parallel to one another and separated by the tongue 19. The jaws 49 are actuated from an open position to a closed position by pressure exerted against the lower portions of the confronting surfaces 53 and specifically, when the male connector 11 is inserted between the jaws, pressure against the lowermost edges of the hollows 53. The hollows 53 are of sufficient height, width and depth to receive the bulbus portion 17 of the male connector 11 when the jaws 49 are in a closed position. The jaws 49 are actuated from a closed position in which the bulbus portion 17 is retained between them to an open position by pressure exerted on the actuating end of the tongue which lowers the tongue out of the arcuate path of the jaws 49 thereby permitting them to be pivotally urged by the springs 55 into an open position as previously described and, by cam action of the lowermost edges of the hollows 53 forcing the bulbus portion 17 of the male connector 11 upwardly and out of the region between the jaws 49.

Alternatively, the tongue 19 can be urged downwardly for releasing the bulbus portion 17 by means of a cable 50 extending through the shaft 15 and bulbus portion 17 of the male connector as shown in FIG. 9. A spring 52 circumscribes the cable 50 between the end of the shaft 15 opposite the bulbus portion 17 and an enlargement 54 clamped on to the end of the cable 50. The male connector 11 has an axial bore extending its full length to receive the cable 50. As the enlargement 54 is pressed axially toward the bulbus portion 17 against the opposing force of the spring 52, the stiff end of the cable 50 opposite the enlargement 54 is urged against the tongue 19 to unlatch the bulbus portion 17. A cap member 56 having an outer diameter larger than the diameter of the cable receiving bore can be clamped onto the end of the cable 50 to prevent the cable 50 from being withdrawn from the male connector 11.

In this manner the male connector 11 and female connector 13 can be securely coupled to provide high retention and resistance to forces exerted to pull the male connector 11 and female connector 13 apart. However, the male and female connectors can be easily separated by relatively little force applied to the tongue 19 and separation is instantaneous and positive.

The housing 41 can be formed from any rigid material and in the preferred embodiment of the invention it is made of a non-corrosive plastic. The jaws 49 and tongue 19 are also preferably formed of a rigid material and in the preferred embodiment of the invention are molded from a strong and rigid plastic. A housing cover 69 having a circular aperture of diameter greater than the maximum diameter of the bulbus portion 17 of the male connector 11 can be fastened over the housing 41 with the aperture providing access to the region between the jaws 49. A notch or cut-out in the cover 69 congruent with the cutout in the wall 45 adjacent the actuating end of the tongue 19 is provided to prevent interference with the movement of the tongue 19. The inner wall dimensions of the cover 69 are preferably such that the ends of the pins 47 and 57 have little clearance between opposite walls of the cover 69 thereby causing the pins 47 and 57 to be retained within the walls 45 of the housing 41.

In order to prevent movement of the tongue 19 in an axial direction, that is in a direction parallel to its length, the end of the tongue 19 opposite the actuating end may be provided with ears having a maximum span greater than the width of the notch provided in the adjacent wall 45 for preventing the tongue 19 from being moved axially in a direction from the opposite end toward the actuating end. Movement of the tongue in the opposite direction, that is from the actuating end toward the opposite end is prevented by the abutting wall of the cover 69 adjacent the opposite end of the tongue 19.

The male connector 11 can be cast or molded from a continuous mass of rigid material such as steel or a hard plastic. The bulbus portion 17 and shaft 15 of the male connector 11 can be separately formed and then joined permanently by a welding process or separably by providing a threaded bore in the bulbus portion 17 and complementary threads on the exterior of the shaft 15. The end of the shaft 15 opposite the bulbus portion 17 can be provided with suitable means for attachment to a device or member which is to be connected to another device or member to which the female connector 13 is connected. For example in the application shown in FIGS. 1-4, the end of the shaft 15 opposite the bulbus portion 17 may be provided with a flange suitable for welding or bolting to the underside of the cab 3.

In another preferred embodiment of this invention, tongue 19 is formed with an opening 19a therethrough of predetermined shape and location, to permit the passage of dirt, water or undesirable particles therethrough. This provides a self-cleaning aspect to the invention where a buildup of matter on the tongue or in areas that would otherwise interfere with the normal operation of the coupling. FIG. 9 also shows the location of spring 65 (FIG. 7).

Referring now to FIG. 10 of the drawings, the latching device 7 of the invention is shown in the environment of the interior of an automobile for use in releasably securing a seat belt 71 across the lap of a passenger.

As can be seen in FIG. 10, the shaft 15 of the male connector 11 is attached, at its end opposite the bulbus portion 17 to a buckle 73 having means known to those skilled in the applicable art for being secured to the belt 71. The female connector 13 is recessed in the floor of the automobile between the seat 75 and the doorway 77 which permits entrance to the passenger compartment of the automobile. The female connector 13 is preferably held firmly to the frame of the automobile by fasteners 79 seated in apertures 81 of the cover 69 (see FIGS. 5 and 6). The fasteners 79 may be bolts or rivets and are preferably disposed in aligning apertures in the automobile frame.

Slidably mounted in the floor of the automobile adjacent the flange of the cover member 69 is a release member 83 which is disposed over the tongue 19. The release member 83 is preferably made of a rigid light weight plastic and its weight is insufficient to overcome the force of the spring 65 for releasing the male connector 11. Manual exertion of downward pressure on the release member 83 results in transmission of the pressure force to the tongue 19 to release the bulbus portion 17 of the male connector 11 when it is desired to remove the seat belt 71, as before exiting from the passenger compartment of the automobile. To re-engage the seat belt, the belt 71 is merely drawn across the lap of the passenger and the male connector 11 is then inserted, bulbus portion 17 first, into the female connector 13.

Referring now to FIGS. 11 and 12 of the drawings, another application for the invention is shown in the environment of the interior of an automobile. In this instance the invention serves for removably mounting a seat in the automobile, preferably of the station wagon type. This application is particularly useful when it is desired to store or carry large and/or numerous articles within the interior of the automobile and the number of passengers to be transported makes the presence of one of the automobile seats unnecessary.

Mounted to the underside of an automobile seat 85 at each of its four corners is a male connector 11 with the axis of its shaft 15 vertically disposed and its bulbus portion 17 at the downward extremity. A female connector assembly 13 is recessed into the floor of the automobile with the central aperture in its cover 69 in alignment with the axis of the shaft 15 for each of the four male connectors 11 at positions corresponding to the desired position of the seat 85 when it is mounted in the automobile. The upper surface of the cover member 69 of the female connector 13 is preferably flush with the upper surface of the floor of the automobile.

To facilitate removal of the seat 85, it is desirable to be able to release two of the male connectors from their respective female connectors simultaneously. That is, it is preferable to be able to disengage the rear connectors simultaneously and to disengage the front connectors simultaneously. In order to achieve this function, there is mounted beneath the floor of the automobile a cable and pulley assembly including outer pulleys 87 which are rotatably mounted on the underside of the automobile with the outermost regions of their circumferences, that is the leftmost region of the left pulleys and the rightmost regions of the right pulleys being in substantial vertical alignment with the centers of the respective tongue members 19 of the proximate female connector assemblies 13. Symmetrically rotatably mounted on either side of the midpoint between the pulleys 87 and in a plane common therewith are pulleys 89.

A cable 91 is connected to the tongue member 19 of each female connector assembly 13 and extends downwardly over the circumference of the corresponding outer pulley 87, inwardly beneath the adjacent inner pulley 89 and then upwardly through an aperture in the floor of the automobile where it is attached to a handle 93. The tongue member 19 may be provided with an aperture 95 as shown in FIG. 6 for securing the cable 91 to the tongue 19 as by clamping the end of the cable 91 with a clamp larger than the aperture 95 or tying a not in the cable 91 to prevent withdrawal through the aperture 95 in the tongue 19.

The two rear cables 91 are attached to a single handle 93 so that when the handle 93 is pulled upwardly the respective tongues 19 to which the cables 91 are connected are simultaneously pulled downwardly thereby releasing the male connectors 11 from the female connectors 13. A similar arrangement is provided at the front of the seat 85 for disengaging the front connector assemblies 9. To remove the seat 85 from the automobile, both handles 93 are pulled upwardly at which time the seat may be withdrawn from the vehicle. To reinstall the seat it is only necessary to align the four male connectors 11 with their corresponding female connectors 13 and to urge the seat 85 downwardly thereby causing the bulbus portions 17 of the respective male connectors 11 to be latched into the female connectors 13 as previously explained.

A variation on the mounting arrangement for removably mounting a seat in an automobile is shown in FIG. 13. The seat 85' in FIG. 13 is provided at the rear of its underside with male connectors 11 similar to those shown and described with reference to FIGS. 11 and 12. A handle 93 connected to cables 91 mounted on pulleys as previously explained is provided for releasing the seat 85' from the floor of the automobile.

At the front of the underside of the seat 85' there are mounted forwardly facing hook-shaped brackets 97. Recessed in the floor of the automobile beneath each of the hook brackets 97 is a rectangular housing 99 with a cover member 101. Between the cover member 101 and the opposite vertical wall of the housing 99 there is defined a gap which is wider than the thickness of the hook-like portion of the bracket 97 but narrower than the length of a transverse end 103 of the bracket 97.

A cylindrical pin 105 is mounted within the housing 99 with its axis transverse to the plane in which the seat 85' is tilted as shown in phantom lines in FIG. 3. The pin 105 acts as a fulcrum for the hook-like bracket member 103 for tilting the seat 85' upwardly to disengage the rear connector assemblies 9 as previously described. This arrangement permits the seat 85' to be tilted upwardly temporarily as for example when it is desired to make room for inserting an article into or removing it from the vehicle. Should it be desirable to remove the seat 85' entirely from the vehicle, it is only necessary to pull upwardly and rearwardly on the seat 85' after it is tilted upwardly to the position shown in phantom lines in FIG. 13. The distance of the transverse end 103 of the bracket 99 from the undersurface of the housing cover 101 is less than the width of the gap atop the housing 99 thereby permitting the bracket 97 to be removed from within the housing 99 as the seat is removed from the automobile. In order to reattach the seat, the brackets 97 are inserted through the gap in the housing 99 with the transverse ends 103 of the brackets passing beneath the pin 105 after which the seat is then rotated downardly to the position shown in solid lines in FIG. 13 at which time the weight of the seat or additional downward urging causes the male connectors 11 to be engaged in the female connectors 13 as previously described.

Referring now to FIGS. 14 and 15 of the drawings there is shown still another application for the instant invention in the environment of an automobile. Specifically, the latching device of the instant invention can be used to latch the lids of the automobile engine compartment and luggage compartment respectively in a securely closed position while permitting either or both lids to be released for opening from within the passenger compartment of the automobile. By mounting the female connector assembly 13 within the engine or luggage compartment with its surface flush with or immediately beneath the body surface upon which the lid is seated and attaching the male connector assembly 11 to the lid so that its bulbus portion 17 can be received in the female connector, the latching arrangement is achieved.

A cable 91' can be connected to the tongue member 19 of the female connector assembly 13 via an aperture 95 in the tongue 19 and can then be passed around the circumference of a pulley 107 rotatably mounted by means of a bracket 109 on the body of the automobile within the engine compartment or luggage compartment, as the case may be, with the other end of the cable 91' being attached to a handle 111 or 111' mounted on or beneath the instrument panel within the passenger compartment in a position readily accessible to the driver. A second pulley (not shown) can be placed beneath the handle under the instrument panel to receive the cable 91' thereby facilitating placement of the handles 111 or 111' while permitting actuation of the tongue member 19 to disengage the connector assembly 9. When the handle 111 is pulled, the corresponding male connector 11 is urged out of the female connector 13 thereby partially lifting the hood or engine compartment lid sufficiently for grasping by a service attendant to raise the hood to its fully open position. Similarly, when the handle 111' is pulled, the trunk or luggage compartment lid is forced partly open to allow a person seeking access to the luggage compartment to grasp and raise the lid.

Figure 16:
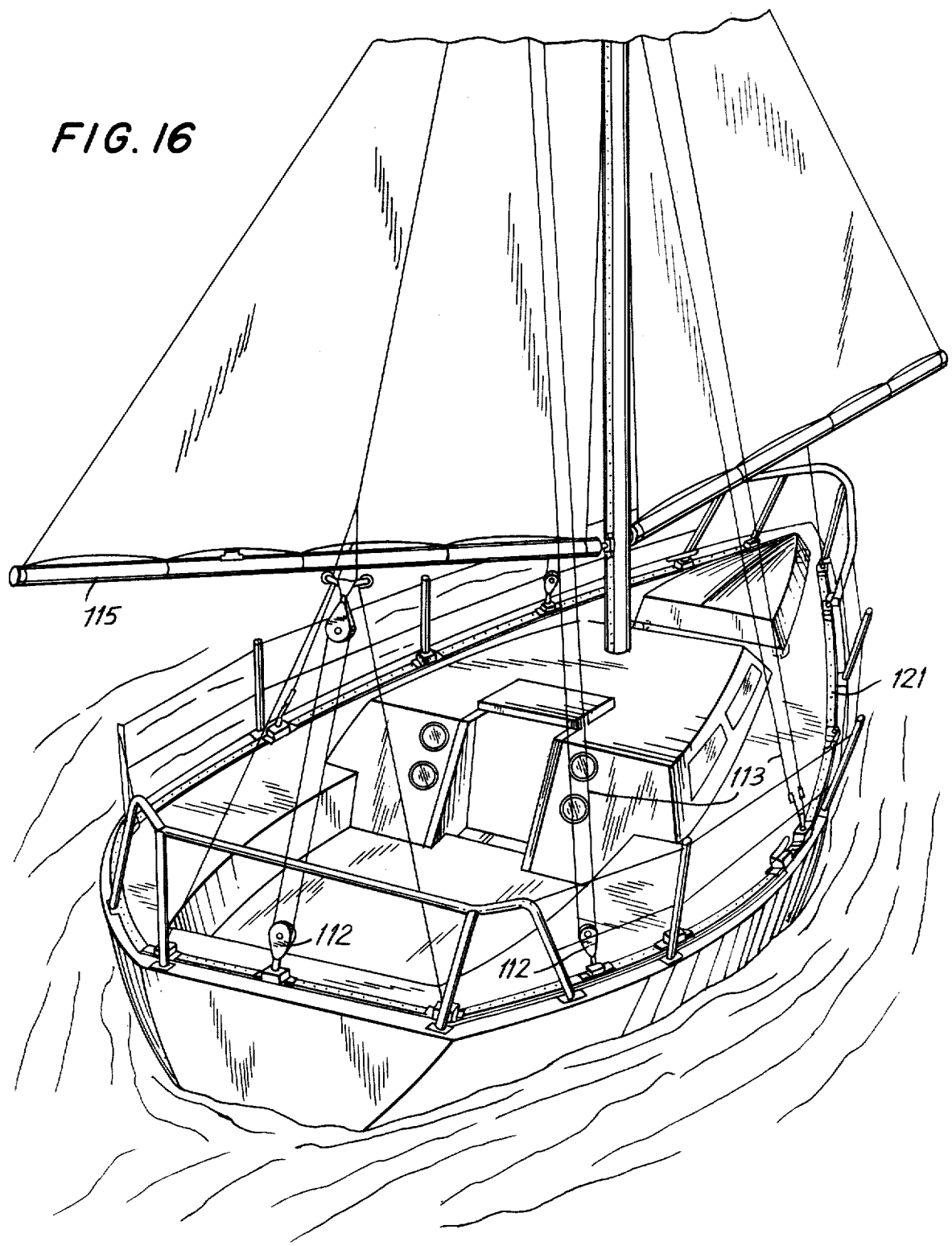
FIG. 16 is a perspective view a fourth alternate preferred embodiment of the invention in its intended environment.

Referring now to FIGS. 16–18 of the drawings, there is shown another environment in which a modified embodiment of the invention can be applied. FIG. 16 shows a sailboat having lines 113 connected to pulleys 112 which lines must be drawn taught during certain modes of operation of the sailboat and yet must be releasable when the orientation of the sails is to be changed or when the sails are to be stowed. Also shown in FIG. 16 are booms 115 which extend substantially horizontally from the mast 117. In order to properly position and adjust the sails, it is desirable to be able to raise and lower the booms 115 and change the elevation point at which each boom 115 is connected to the mast 117. It is also desirable to be able to slide the pulleys 112 along the rails on which they are mounted and to be able to slide the ends of the booms 115 upwardly and downwardly along the mast without the pulleys separating from the side rails and without the booms separating from the mast.

To achieve the desired attributes of a connector which can be applied to removably secure one component of a ship to another or to allow confined movements of one component with respect to another, the latching connector assembly of the invention shown in FIG. 17 can be used. There a pulley 112 which is circumscribed by a line 113 has downwardly extending from it a male connector assembly 11 with bulbus portion 17 according to the invention. The female connector assembly 13' is similar to that disclosed with reference to FIGS. 5 and 6 of the drawings but with the following differences. The housing of the female connector assembly is securely mounted atop a slide 119 which is slidably mounted on a rail 121 which is in turn mounted atop the sides of the boat. The slide 119 has edges which are turned downwardly and inwardly to provide a captured fit between the slide 119 and rail 121 as best seen in FIG. 18 whereby only longitudinal movement of the slide 119 relative to the rail 121 is permitted.

Mounted at either end of the female connector assembly 13' on the slide 119 is a slide latching mechanism which includes a plunger 123 slidably mounted within a cylindrical boss 125 rising upwardly from the upper surface of the slide 119. The plunger 123 has an enlarged circular bottom. A spring 127 circumscribes the plunger 123 and is entrapped between a shoulder defined at the juncture of the plunger 123 with its enlarged bottom portion and the undersurface of the top of the boss 125. The spring 127 urges the plunger 123 downwardly against the upper surface of the rail 121.

The rail 121 is provided with equally spaced circular apertures centered along the axis of the rail 121 with each aperture being spaced a distance from its adjacent apertures equal to the distance between the enlarged bottom portions of the plungers 123 on either side of the housing of the female connector assembly 13'. The enlarged bottom portions of the plungers 123 taper inwardly adjacent the underside which engages the rail 121 so that as the slide is positioned with the plungers 123 over the apertures in the slide 121 the enlarged portions of the plungers 123 are urged into the apertures. The maximum outer diameters of the enlarged portions at the bottoms of the plungers 123, as shown in the view of FIG. 18, are just slightly less than the diameters of the apertures on the rail 121 so that the enlarged portions are snuggly received in the apertures thereby preventing further movement of the slide 119 along the rail 121.

In order to disengage the enlarged ends of the plunger 123 from the apertures to permit movement of the slide 119, circular grasping knobs 129 are provided atop the plungers 123 and opposite the ends where there are disposed the enlarged portions adapted to be captured in the holes on the rail 121. The knobs 129 can be grasped to lift the plungers 123 against the force of the springs 127 while the slide 119 is urged in a longitudinal direction to effect movement to a position where the enlarged portions of the plungers 123 can again be captured in apertures on the rail 121.

Referring to FIG. 19 of the drawings, the end of a boom 115 can be fitted with a male connector 11 while the female connector assembly 13' mounted on a rail 121 can be securely attached to the mast 117 in an orientation for vertical movement of the slide 119 along the mast 117. In this application the female connector assembly 13' of FIGS. 17 and 18 can be used without modification. Only the male connector 11 need be modified for attachment to the end of the boom 115. The male connector 11 can be screwed into the end of the boom 115 or nailed in or attached by an adhesive or by any other means known to the art.

Figure 20:
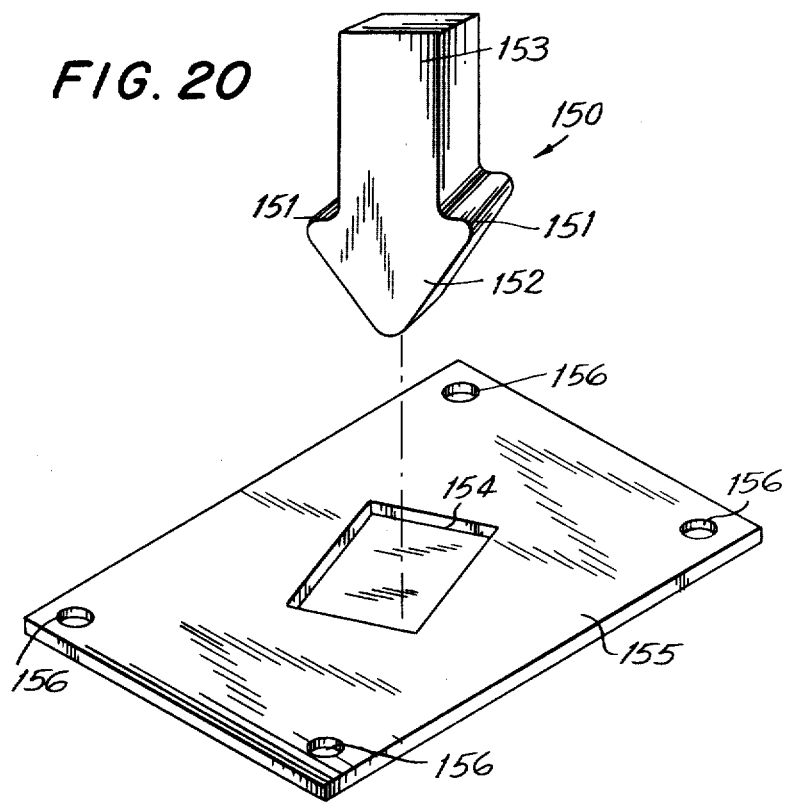
FIG. 20 is a fragmentary partial perspective view of an embodiment of the present invention illustrating an alternate to the "ball" or spherical-shaped male member to be releasably captured.

Referring now to FIG. 20, one of an infinite number of non-spherical bulbus male members is shown in the form of male members 150, being formed with shoulders 151 which define an overall reclilinear cross-section. A tapered nose portion 152 opposite the shaft 153 or other structure with which member 150 is integral facilitates initial penetrating alignment of the male member 150 with an opening 154, for example, formed in receiving member 155. This invention contemplates varying the shapes of the male member and providing interchangeable receiving members that are capable of allowing keying and selfalignment. In FIG. 20, member 155 is presented in the context of a replaceable cover formed with mounting holes 156 adapted to receive conventional fasteners.

Figure 21:
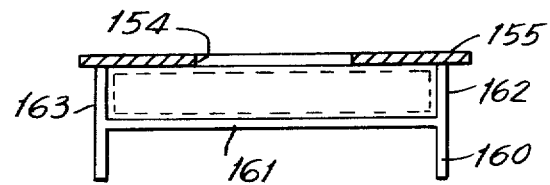
FIG. 21 is a sectional view of an embodiment of this invention illustrating the use of an I-beam as the anchoring structure within which portions of the latch keeping mechanism are housed.

FIG. 21 is a relatively simplistic depiction of an I-beam 160 oriented horizontally within the drawing so as to illustrate an ability to utlize the area between its web 161 and spaced flanges 162 and 163 for the female keeping portion of the latch according to the present invention. It is contemplated to utilize such recesses within members such as I-beams, channels or other structural shapes that serve the dual purpose of a strengthening member and a latch housing.

Figure 22:
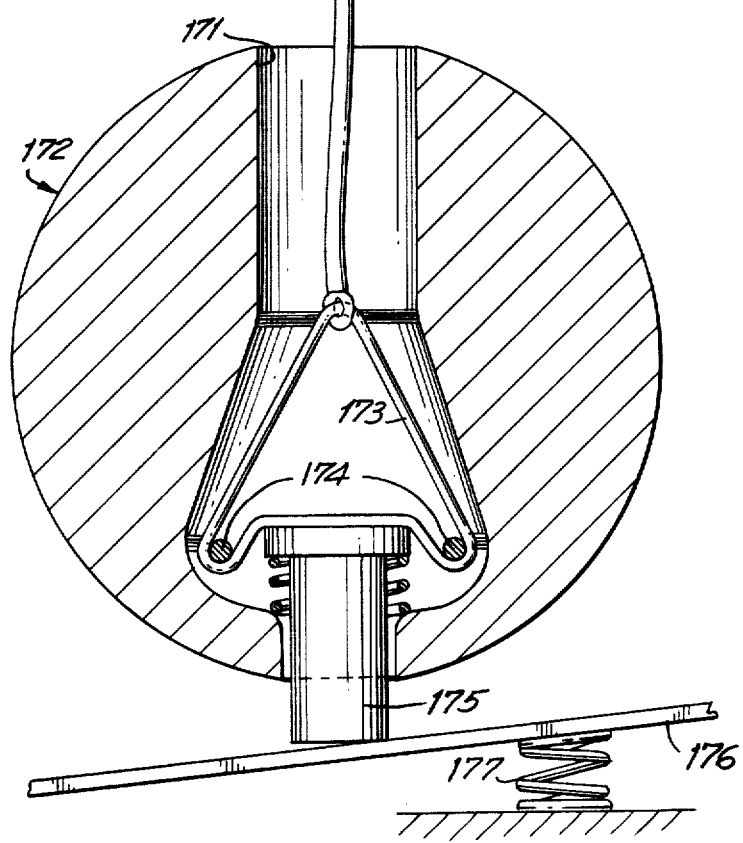
FIG. 22 is a fragmentary sectional elevational view of another embodiment of the invention; wherein remote "pulling" of a control cable will enable unlatching.

FIG. 22 is presented to illustrate a capability with the present invention of not only having the positive latching and positive release already made clear from the description of prior views of the drawings, but of further being able to remotely release the coupling from a desired location spaced from the coupling itself. For example, the coupling or latch according to the present invention may be used to join the supporting corner of a sail with a fixture at the top of a mast, for example, where it is desired not to keep the halyard in tension or where a fixed sail location is desired. In such cases, a cable-type release in the form of a cable 170 is shown in FIG. 23 leading into a central bore 171 formed within ball 172 to a loop 173 extending around two anchor pins 174 integral with ball 172. An actuating pin 175 is movable situated within bore 171 and is capable of protruding in reciprocal fashion from the ball proximate a release tongue 176 normally spring-biased toward pin 175 by helical spring 177 in a manner previously described. By pulling upon the cable 170 from on the deck or within the cockpit of a sailboat, just to give an example, loop 173 will become taut as it is stretched about anchor pins 174 and will force actuating pin 175 from the forward end of ball 172 into contact with tongue 176, thereby urging the tongue against the force of spring 177 to a releasing position whereby ball 172 will be positively ejected from its capturing confines in the manner described for FIGS. 5–9, as an example.

In this way, a signal may be reliably raised or any weight carried aloft without straining the hoisting member, and it may be remotely released when desired. It is contemplated to utilize this novel coupling concept within conduits that are otherwise too small for human access.

The positive latching connector of the invention has been described with reference to several embodiments and applications but it is to be appreciated that there are numerous other applications in which the invention can be used and embodiments of the invention which may differ from the disclosed preferred embodiments of the invention without departing from the spirit and scope of the invention which is defined in the following claims.

What is claimed is:

1. A latching system, comprising, in combination: a supporting structure, at least one capture member supported for movement between capturing and releasing positions by said supporting structure, a locking member for the captive member supported for movement between interfering and non-interfering positions by said supporting structure, first spring means carried by said supporting structure normally biasing said capture member toward said releasing position, second spring means carried by said supporting structure normally biasing said locking member toward said interfering position, unlocking means integral with said locking member for enabling movement of the locking member toward said non-interfering position, ball means adapted to be releasably captured by said capture member, said ball means being formed with an internal cavity, cable means with portions thereof disposed within said cavity for influencing said unlocking means from a location remote from said locking member, pin means disposed within said cavity for guiding portions of said cable means and spring-biased protruding means extending from said ball means and moveable in response to movement of said cable means, said locking member being movable in response to movement of said protruding means, said latching system being capable of releasably capturing at least one said ball means desired to be retained and wherein actuation of said unlocking means with a first force results in forcible ejection of said retained member with a second force.

* * * * *